United States Patent
Kim et al.

(10) Patent No.: US 12,506,183 B2
(45) Date of Patent: Dec. 23, 2025

(54) BATTERY CONTROL SYSTEM AND METHOD OF FUEL CELL VEHICLE

(71) Applicants: Hyundai Motor Company, Seoul (KR); Kia Corporation, Seoul (KR)

(72) Inventors: Ki Chang Kim, Seoul (KR); Seung Won Baik, Suwon-Si (KR); Young Woo Jung, Yongin-Si (KR); Sang Hyun Yoon, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 554 days.

(21) Appl. No.: 17/981,882

(22) Filed: Nov. 7, 2022

(65) Prior Publication Data

US 2023/0402659 A1 Dec. 14, 2023

(30) Foreign Application Priority Data

Jun. 13, 2022 (KR) .................. 10-2022-0071605

(51) Int. Cl.
| | |
|---|---|
| *H01M 10/42* | (2006.01) |
| *H01M 8/04537* | (2016.01) |
| *H01M 8/04664* | (2016.01) |
| *H01M 10/48* | (2006.01) |
| *H01M 16/00* | (2006.01) |

(52) U.S. Cl.
CPC ..... *H01M 10/425* (2013.01); *H01M 8/04552* (2013.01); *H01M 8/04582* (2013.01); *H01M 8/04671* (2013.01); *H01M 10/48* (2013.01); *H01M 16/006* (2013.01); *H01M 2010/4271* (2013.01); *H01M 2220/20* (2013.01); *H01M 2250/20* (2013.01)

(58) Field of Classification Search
CPC .......... H01M 10/425; H01M 10/4257; H01M 10/48; H01M 10/633; H01M 8/04552; H01M 8/04582; H01M 8/04604; H01M 8/04671; H01M 8/04992; H01M 16/006; H01M 2010/4271; H01M 2010/4278; H01M 2220/20; H01M 2250/20
See application file for complete search history.

(56) References Cited

U.S. PATENT DOCUMENTS

| | | |
|---|---|---|
| 2013/0211798 A1 | 8/2013 | Maier |
| 2016/0144738 A1* | 5/2016 | Lee .................. B60L 58/40 320/101 |

(Continued)

FOREIGN PATENT DOCUMENTS

| | | |
|---|---|---|
| JP | 2006-40718 | 2/2006 |
| JP | 2006-94628 | 4/2006 |

(Continued)

*Primary Examiner* — Christopher P Domone
(74) *Attorney, Agent, or Firm* — Morgan Lewis & Bockius LLP

(57) ABSTRACT

A battery control system and method of a fuel cell vehicle includes a battery, a fuel cell, and a controller. The battery provides driving energy of a vehicle. The fuel cell provides the driving energy of the vehicle or charging the battery. The controller estimates a degree of deterioration of the fuel cell, derive a change rate in an SOC value of the battery based on the degree of deterioration of the fuel cell, and change a charge control factor or a discharge control factor of the battery according to the derived change rate in the SOC value of the battery.

18 Claims, 9 Drawing Sheets

(56) References Cited

U.S. PATENT DOCUMENTS

2019/0016329 A1     1/2019   Park et al.
2022/0359896 A1*   11/2022   Fan .................. H01M 8/04626

FOREIGN PATENT DOCUMENTS

| KR | 10-2008-0052094 | 6/2008 |
| KR | 10-896216 | 5/2009 |
| KR | 10-949260 | 3/2010 |
| KR | 10-2015-0005868 | 1/2015 |

* cited by examiner

FIG. 5

| FC Voltage (V) | More than a | a~b | b~c | Less than c |
|---|---|---|---|---|
| FC Deterioration section | F | G | H | I |

FIG. 6

| FC Operating Time (h) | Less than 500 | 500~1000 | 1000~2000 | More than 2000 |
|---|---|---|---|---|
| FC Deterioration section | F | G | H | I |

FIG. 7

| Rate of Change in Battery SOC (level) | | Estimated by FC Operating Time | | | |
|---|---|---|---|---|---|
| | | F | G | H | I |
| Estimated by FC I-V Curve | F | +3 | +2 | +1 | 0 |
| | G | +3 | +2 | +1 | 0 |
| | H | +2 | +1 | 0 | −1 |
| | I | +1 | 0 | −1 | −2 |

FIG. 8

| Battery SOC | ~40% | 40~50% | 50~60% | 60~70% | 70~80% | 80~90% |
|---|---|---|---|---|---|---|
| Rate of Change in Battery SOC (level) | -3 | -2 | -1 | +1 | +2 | +3 |

FIG. 9

| Rate of Change in Battery SOC (level) | −3 | −2 | −1 | 0 | +1 | +2 | +3 |
|---|---|---|---|---|---|---|---|
| Control of upper voltage limit of FC | 3 levels down | 2 levels down | 1 level down | Do not Control | 1 level up | 2 levels up | 3 levels up |
| Ex. (V) | 360 | 365 | 370 | 375 | 380 | 385 | 390 |

# BATTERY CONTROL SYSTEM AND METHOD OF FUEL CELL VEHICLE

CROSS REFERENCE TO RELATED APPLICATION

The present application claims priority to Korean Patent Application No. 10-2022-0071605 filed on Jun. 13, 2022, the entire contents of which is incorporated herein for all purposes by this reference.

Background of the Present Disclosure

FIELD OF THE PRESENT DISCLOSURE

The present disclosure relates, generally, to a battery control system and method of a fuel cell vehicle, and more particularly, to a battery control system and method of a fuel cell vehicle, the system and method being able to derive the change rate in the state of charge (SOC) value of a battery based on the degree of deterioration of a fuel cell and change the charge control factor or the discharge control factor of the battery according to the derived change rate in the SOC value of the battery, preventing the battery from being overcharged or overdischarged.

DESCRIPTION OF RELATED ART

Recently, the distribution of eco-friendly vehicles, such as electric vehicles (EVs), is increasing due to environmental issues of internal combustion engine (ICE) vehicles. In general, an EV refers to a vehicle which is propelled using driving power of a motor actuated using electrical energy.

Such EVs may include a hybrid electric vehicle (HEV) that produces driving power from a motor using electrical energy charged in a vehicle high-voltage battery in addition to a conventional ICE, a fuel cell electric vehicle (FCEV) that produces driving power from a motor using electrical energy generated by a fuel cell, and the like.

A fuel cell disposed in a fuel cell vehicle is a device that generates electrical energy through an electrochemistry reaction inside a fuel cell stack by receiving hydrogen and air from external sources. The fuel cell has an output voltage of about −1 V to about 1.2 V.

Such a fuel cell is advantageously eco-friendly but is disadvantageously unsuitable to rapidly supply power in response to changes in output power of a vehicle.

Thus, to cope with such changes in the output power of a vehicle, even a fuel cell vehicle is generally provided with a high-voltage battery (hereinafter, referred to as a "battery") to provide driving power of a motor.

That is, a fuel cell in a fuel cell vehicle serves as a main power source that provides driving energy of the fuel cell vehicle by generating electrical energy by an electrochemistry reaction, whereas a battery serves as an auxiliary power source that provides driving energy of the fuel cell vehicle together with the fuel cell provided as the main power source.

Furthermore, electrical energy generated by the fuel cell is configured to be supplied to a load of the vehicle or the battery to drive the load or charge the battery. The electrical energy charged in the battery is discharged from the battery to supplement driving energy of the fuel cell vehicle when the load of the vehicle is increasing rapidly (e.g., when high output power is required).

Meanwhile, the battery disposed in the fuel cell vehicle may store regenerative braking energy occurring during gliding (or coasting drive) or decelerating drive of the vehicle.

Here, the coasting refers to a state in which a vehicle is being moved by inertia according to the current speed when the driver is pressing neither the accelerator pedal nor the brake pedal during the driving of the vehicle, whereas the decelerating drive refers to a state in which the vehicle is moving while being rapidly decelerated by the driver pressing the brake pedal during the driving of the vehicle.

Furthermore, in the regenerative braking, when a vehicle is gliding or the brake pedal is pressed, power that has been supplied to the motor is cut off but counter electromotive force is generated from the motor by wheels rotating due to the inertia of the moving vehicle. When the counter electromotive force is applied to the motor, reverse torque (i.e., regenerative braking torque) occurs in the motor, generating braking force of the vehicle.

Such regenerative braking recovers energy that would otherwise be wasted, achieving an effect of improved fuel efficiency. Regenerative braking is applied to most commercial vehicles. Regenerative braking energy in a fuel cell vehicle is used to charge a battery.

Meanwhile, when overcharged, a battery has a risk of explosion. When overdischarged, internal electrodes (i.e., a cathode and an anode) inside a high-voltage battery may be permanently damaged due to sulfation, making it impossible to reuse the battery.

In this regard, to ensure the durability of a battery in a fuel cell vehicle, the battery is managed by setting the lower limit and the upper limit to the SOC value of the battery so that the SOC thereof remains at a suitable level.

That is, in a predetermined situation such as when the SOC value of the battery reaches the upper limit (hereinafter, when the "battery is overcharged") or when the SOC value of the battery reaches the lower limit (hereinafter when the "battery is overdischarged"), the charging or discharging of the battery is restricted.

When the battery is overcharged, the battery may not be able to store regenerative braking energy any Furthermore, and thus regenerative braking is stopped. At the instant time, the vehicle is free from load and accelerated, and thus the driving quality of the vehicle is degraded. In response to the regenerative braking being stopped, the fuel efficiency may be lowered, which is problematic.

In the overdischarging of the battery, when the load of the vehicle rapidly increases, for example, instantaneous high power is required, a necessary amount of output power cannot be obtained from the battery. In the instant case, driving energy of the fuel cell vehicle should be provided only using the output power of the fuel cell, and thus the motor of the vehicle may fail to sufficiently provide an instantaneously required voltage, disadvantageously degrading the accelerating performance of the vehicle.

Accordingly, provision of a technology able to prevent special situations in which the charging or discharging of the battery is restricted as described above is urgently required.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a battery control system and method of a fuel cell vehicle, the system and method being able to derive the change rate in the SOC value of a battery based on the degree of deterioration of a fuel cell and change the charge control factor or the discharge control factor of the battery according to the derived change rate in the SOC value of the battery, preventing the battery from being overcharged or overdischarged.

To obtain at least one of the above-described objectives, according to an exemplary embodiment of the present disclosure, provided is a battery control system of a fuel cell vehicle. The battery control system may include: a battery providing driving energy of the vehicle; a fuel cell providing the driving energy of the vehicle or charging the battery; and a controller configured to estimate a degree of deterioration of the fuel cell, derive a change rate in an SOC value of the battery based on the degree of deterioration of the fuel cell, and change a charge control factor or a discharge control factor of the battery according to the derived change rate in the SOC value of the battery.

The controller may estimate the degree of deterioration of the fuel cell based on an operating time of the fuel cell or I-V characteristics curves of the fuel cell.

The controller may be configured to determine the degree of deterioration of the fuel cell based on the I-V characteristics curves of the fuel cell. The degree of deterioration of the fuel cell may be estimated based on a voltage of the fuel cell measured at a predetermined reference current.

The predetermined reference current may be a current measured at an upper limit voltage of the fuel cell having a fresh state.

The controller may divide the degrees of deterioration of the fuel cell, estimated based on the operating time of the fuel cell or the I-V characteristics curves of the fuel cell, into a plurality of deterioration sections and derive the change rate in the SOC value of the battery from each of the deterioration sections.

The controller may derive a first change rate of the SOC value of the battery based on the degree of deterioration of the fuel cell, measure a current SOC value of the battery while driving of the vehicle, and derive a second change rate of the SOC value of the battery according to a difference between the current SOC value of the battery measured during the driving of the vehicle and a predetermined reference value.

The controller may derive a third change rate of the SOC value of the battery based on the derived first change rate of the SOC value of the battery and the derived second change rate of the SOC value of the battery.

The controller may change the charge control factor of the battery according to the first change rate of the SOC value of the battery and change the discharge control factor of the battery according to the third change rate of the SOC value of the battery.

The charge control factor of the battery may be an upper limit voltage of the fuel cell, and the discharge control factor of the battery may be an amount of output of the battery.

The controller may change the amount of output of the battery by adjusting a ratio of an output of the battery and an output of the fuel cell or adjusting the upper limit voltage of the battery.

According to an exemplary embodiment of the present disclosure, provided is a battery control method of a fuel cell vehicle. The battery control method may include: estimating, by the controller, the degree of deterioration of the fuel cell; deriving, by the controller, the change rate in the SOC value of the battery based on the degree of deterioration of the fuel cell; and changing, by the controller, the charge control factor or the discharge control factor of the battery according to the derived change rate in the SOC value of the battery.

In the estimating of the degree of deterioration of the fuel cell, the controller may estimate the degree of deterioration of the fuel cell based on an operating time of the fuel cell and I-V characteristics curves of the fuel cell.

The deriving of the change rate in the SOC value of the battery may include: deriving, by the controller, a first change rate of the SOC value of the battery based on the degree of deterioration of the fuel cell; measuring, by the controller, a current SOC value of the battery while driving of the vehicle and deriving, by the controller, a second change rate of the SOC value of the battery according to a difference between a current SOC value of the battery measured while driving of the vehicle and a predetermined reference value; and deriving, by the controller, a third change rate of the SOC value of the battery based on the first change rate of the SOC value of the battery and the second change rate of the SOC value of the battery.

In the changing of the charge control factor or the discharge control factor of the battery, the controller of change the charge control factor of the battery according to the first change rate of the SOC value of the battery and change the discharge control factor of the battery according to the third change rate of the SOC value of the battery.

In the changing of the charge control factor or the discharge control factor of the battery, the controller may change an upper limit voltage of the fuel cell or changes an amount of output of the battery.

The battery control system and method of a fuel cell vehicle according to an exemplary embodiment of the present disclosure has the following effects.

First, it is possible derive the change rate of the SOC value of the battery based on the degree of deterioration of the fuel cell and change the charge control factor or the discharge control factor of the battery according to the derived change rate of the SOC value of the battery, preventing the battery from being overcharged or overdischarged.

Second, it is possible to divide reasons for the change rate of the SOC value of the battery into the degree of deterioration of the fuel cell or the driving pattern of the vehicle and change the charge control factor or the discharge control factor of the battery in response to respective situations, stably adjusting the SOC value of the battery.

Third, it is possible to prevent the battery from being overcharged or overdischarged by stably adjusting the SOC value of the battery, preventing the problems of reduced fuel efficiency and reduced acceleration performance of the vehicle caused by the stopping of the regenerative braking.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 5 is a table illustrating the degrees of deterioration of the fuel cell estimated based on the I-V characteristics curves of the fuel cell and divided into a plurality of deterioration sections;

FIG. 6 is a table illustrating the degrees of deterioration of the fuel cell estimated based on the operating time of the fuel cell and divided into a plurality of deterioration sections;

FIG. 7 is a table illustrating the rates of change in the SOC value of a battery individually derived in the respective deterioration sections divided in FIG. 5 and FIG. 6;

FIG. 8 is a table illustrating a second change rate in the SOC value of the battery derived according to the current SOC value of the battery measured during the driving of a vehicle;

FIG. 9 is a table illustrating changes in the charge control factor of the battery.

Figure 1:
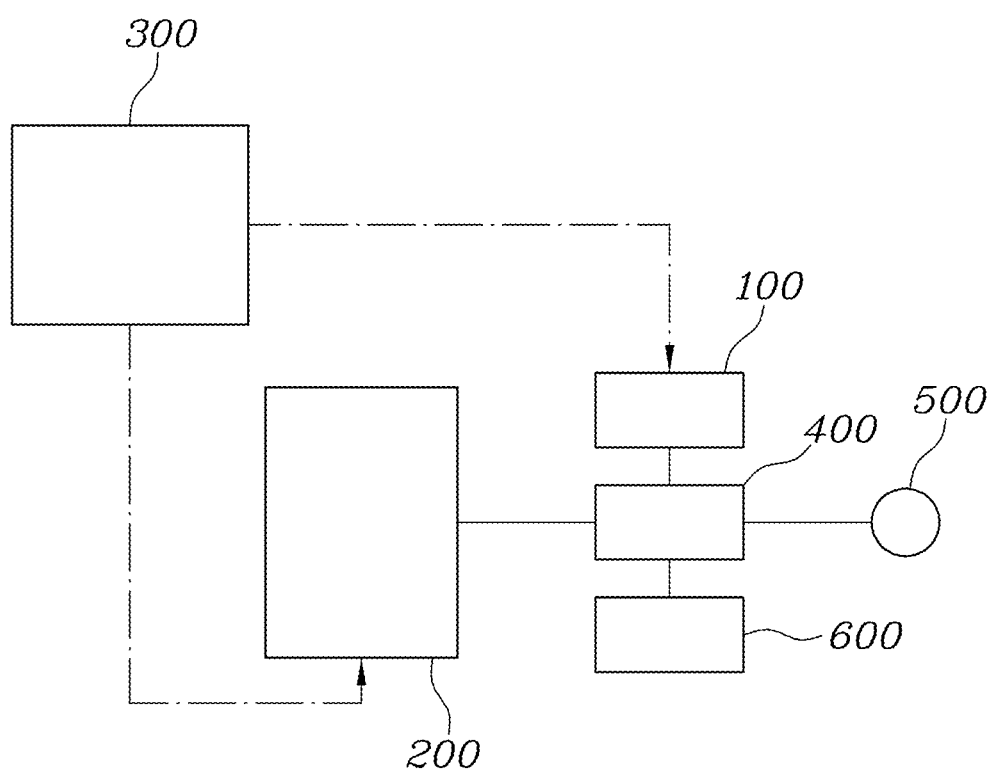
FIG. 1 is a block diagram illustrating a battery control system of a fuel cell vehicle according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

In the present specification, it will be further understood that the terms "comprise", "include", "have", etc. When used in the present specification, specify the presence of stated features, integers, steps, operations, elements, components, and/or combinations thereof but do not preclude the presence or addition of one or more other features, integers, steps, operations, elements, components, and/or combinations thereof.

Furthermore, it will be understood that, although ordinal terms, such as "first" and "second," may be used herein to describe various elements, these elements may not be limited by these terms. These terms are only used to distinguish one element from another element.

In the description of the present disclosure, when it is determined that the detailed description of related art would obscure the gist of the present disclosure, the detailed description thereof will be omitted. Furthermore, the attached drawings are merely intended to be able to readily understand the exemplary embodiments disclosed herein, and thus the technical idea disclosed herein is not limited by the attached drawings, and it should be understood to include all changes, equivalents, and substitutions included in the idea and technical scope of the present disclosure.

A controller 300 according to an exemplary embodiment of the present disclosure may include: a communication device communicating with another controller 300 or a sensor to control undertaking functions; a memory storing an operating system, logic commands, input/output information, and the like; and one or more processors performing judgment, calculation, determination, and the like required to control the undertaking functions.

Hereinafter, the configuration and operating principles of several embodiments of the included disclosure will be described in detail with reference to the drawings. Throughout the drawings, identical or similar constituent elements are provided the same reference numerals, and repeated description thereof will be omitted.

Figure 2:
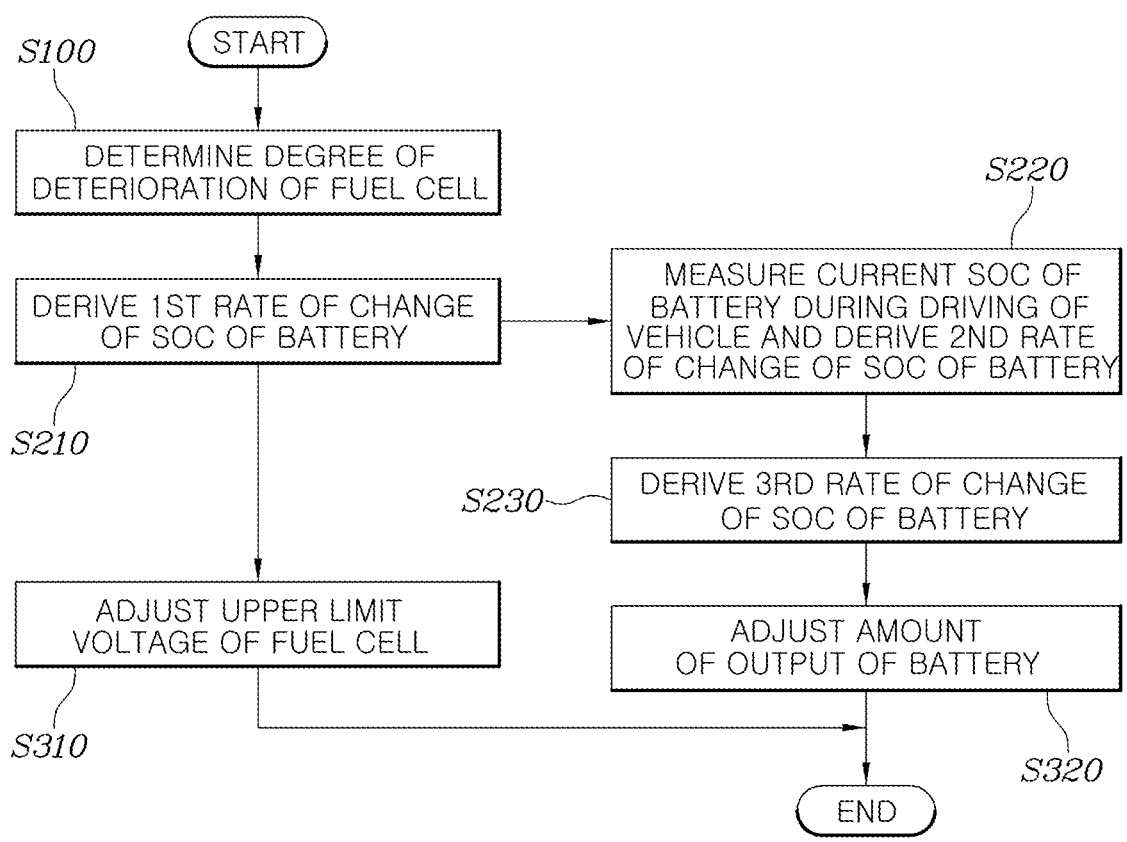
FIG. 2 is a flowchart illustrating a battery control method of the fuel cell vehicle according to an exemplary embodiment of the present disclosure.
Figure 3:
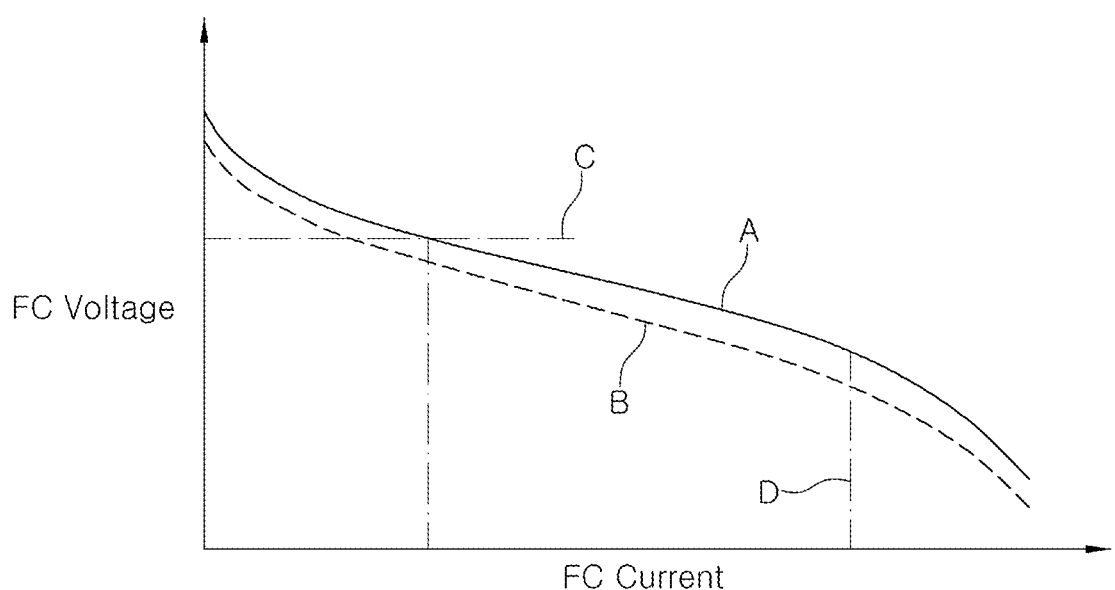
FIG. 3 is a graph illustrating I-V characteristics curves of fuel cells.
Figure 4:
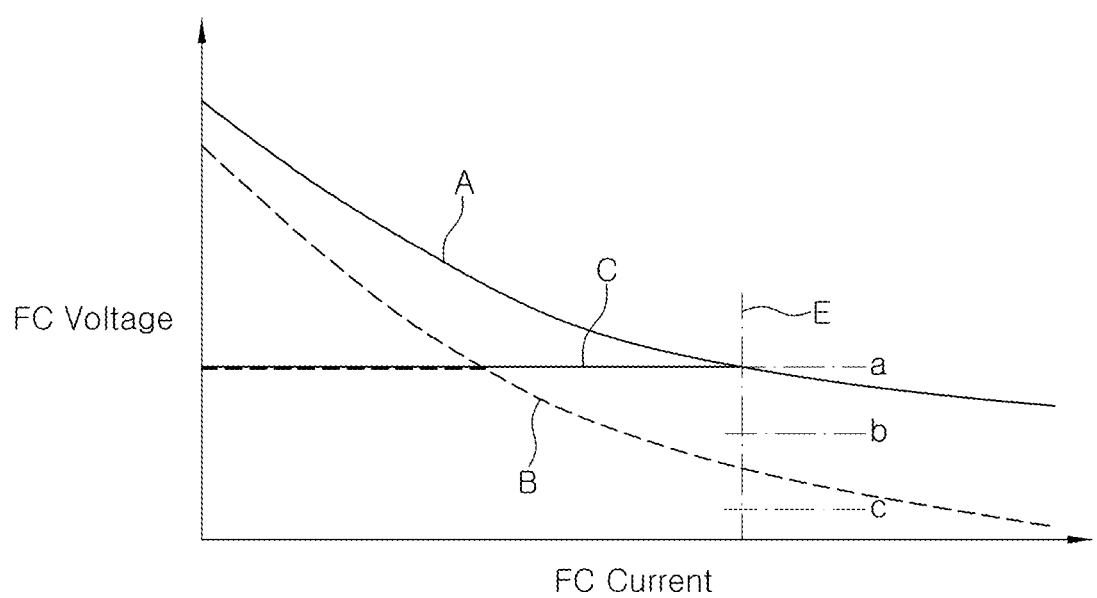
FIG. 4 is a graph illustrating the degree of deterioration of the fuel cell estimated based on the I-V characteristics curves of the fuel cell.
Figure 10:
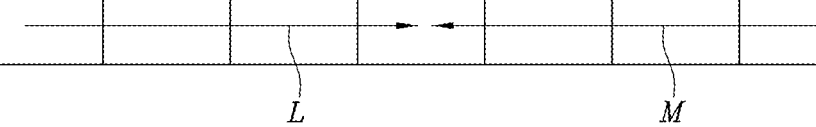
FIG. 10 is a table illustrating changes in the discharge control factor of the battery.

FIG. 1 is a block diagram illustrating a battery control system of a fuel cell vehicle according to an exemplary embodiment of the present disclosure, FIG. 2 is a flowchart illustrating a battery control method of a fuel cell vehicle according to an exemplary embodiment of the present disclosure, FIG. 3 is a graph illustrating I-V characteristics curves of fuel cells 200, FIG. 4 is a graph illustrating the degree of deterioration of the fuel cell 200 estimated based on the I-V characteristics curves of the fuel cell 200, FIG. 5 is a table illustrating the degrees of deterioration of the fuel cell 200 estimated based on the I-V characteristics curves of the fuel cell 200 and divided into a plurality of deterioration sections, FIG. 6 is a table illustrating the degrees of deterioration of the fuel cell 200 estimated based on the operating time of the fuel cell 200 and divided into a plurality of deterioration sections, FIG. 7 is a table illustrating the rates of change in the SOC value of a battery 100 individually derived in the respective deterioration sections divided in FIG. 5 and FIG. 6, FIG. 8 is a table illustrating a second change rate in the SOC value of the battery 100 derived according to the current SOC value of the battery measured during the driving of a vehicle, FIG. 9 is a table illustrating changes in the charge control factor of the battery 100, and FIG. 10 is a table illustrating changes in the discharge control factor of the battery 100.

Referring to FIG. 1, the battery control system of a fuel cell vehicle according to an exemplary embodiment of the present disclosure includes the battery 100 providing driving energy of a vehicle, the fuel cell 200 providing driving energy of the vehicle or charging the battery 100, and the controller 300 configured to estimate the degree of deterioration of the fuel cell 200, derive the change rate in the state of charge (SOC) value of the battery 100 based on the degree of deterioration of the fuel cell 200, and change the charge control factor or the discharge control factor of the battery 100 according to the derived change rate in the SOC value of the battery 100.

In the battery control system of a fuel cell vehicle according to an exemplary embodiment of the present disclosure, the "SOC value of the battery 100" means a value expressed as a percentage (%) by dividing the currently available capacity of the battery 100 with the entire capacity of the battery 100, and is generally abbreviated to SOC. When the SOC value of the battery 100 is 100%, this indicates a state in which the battery 100 is fully charged. In contrast, when the SOC value of the battery 100 is 0%, this indicates a state in which the battery 100 is completely exhausted.

As illustrated in FIG. 1, the fuel cell vehicle may include the fuel cell 200 providing driving energy to a motor 500 of the vehicle, a high-voltage junction box 400 controlling power supplied to a load 600 of the vehicle by receiving power from the fuel cell 200, and the like as essential components, and may further include the battery 100 as an auxiliary power source.

Here, the load 600 of the vehicle may be interpreted as including high-voltage components, such as a vehicle heater, an air conditioner, and a cooling fan, which need to be supplied with power.

As described above in the Background section, in the fuel cell vehicle, in general, the SOC value of the battery 100 is managed to remain at a suitable level by setting the upper limit and the lower limit of the SOC value of the battery 100 to obtain the durability of the battery 100.

That is, when the battery 100 is overcharged (i.e., the SOC value of the battery 100 has reached the upper limit), the charging of the battery 100 is restricted. Thus, regenerative braking is stopped, and fuel efficiency of the vehicle is reduced. When the battery 100 is overdischarged (i.e., the SOC value of the battery 100 has reached the lower limit), the discharging of the battery 100 is restricted. Thus, the acceleration performance of the vehicle is reduced, which is problematic.

Thus, the battery control system of a fuel cell vehicle according to an exemplary embodiment of the present disclosure is directed to estimate the degree of deterioration of the fuel cell 200 by the controller 300, derive the change rate in the SOC value of the battery 100 based on the degree of deterioration of the fuel cell 200, and change the charge control factor or the discharge control factor of the battery 100 according to the derived change rate in the SOC value of the battery 100 to prevent a special situation in which the charging or discharging of the battery 100 is restricted as described above, preventing the problem of reduced fuel efficiency or reduced acceleration performance of the vehicle.

Here, specific operating principles of estimating the degree of deterioration of the fuel cell 200 and changing the charge control factor or the discharge control factor of the battery 100 will be described later, and the "change rate in the SOC value of the battery 100" will be described first.

As described above, in the fuel cell vehicle, the upper limit and the lower limit of the SOC value of the battery 100 are set to manage the SOC value of the battery 100 at an appropriate level. In the instant case, a middle value of the upper limit and the lower limit of the SOC value of the battery 100 may be set as a target SOC, and the SOC value of the battery 100 may be controlled to maintain the target SOC.

In this regard, the situation in which the charging or discharging of the battery 100 is restricted may be prevented by quantifying the degree by which the SOC value of the battery 100 deviates from the target value as a specific value and changing the charge control factor or the discharge control factor of the battery 100 according to the quantified value.

That is, according to an exemplary embodiment of the present disclosure, the "change rate in the SOC value of the battery 100" may be interpreted as a specific value obtained by quantifying the degree by which the SOC value of the battery 100 deviates from the target value.

Furthermore, in the following description of the present specification, for a better understanding of the present disclosure, the change rate in the SOC value of the battery 100 will be expressed according to levels as illustrated in FIG. 7, FIG. 8, FIG. 9 and FIG.

For example, situations in which the SOC value of the battery 100 is the same as the target value will be represented as "level 0," situations in which the SOC value of the battery 100 is greater than the target value will be represented as "level +1," "level +2," and "level +3" by sequentially expressing increasing positive integers, and situations in which the SOC value of the battery 100 is smaller than the target value will be represented as "level −1," "level −2," and "level −3" by sequentially expressing decreasing negative integers.

When the change rate in the SOC value of the battery 100 corresponds to a positive integer, the controller 300 may change the charge control factor so that the ratio of charge of the battery 100 is reduced and change the discharge control factor so that the ratio of discharge of the battery 100 is increased.

In contrast, when the change rate in the SOC value of the battery 100 corresponds to a negative integer, the controller 300 may change the charge control factor so that the ratio of charge of the battery 100 is increased and change the discharge control factor so that the ratio of discharge of the battery 100 is reduced.

That is, the charge control factor or the discharge control factor of the battery 100 may be changed according to the change rate in the SOC value of the battery 100 derived as above based on the degree of deterioration of the fuel cell 200, preventing the situation in which the charging or discharging of the battery 100 is restricted.

Meanwhile, as described above, the "change rate in the SOC value of the battery 100" means a specific value obtained by quantifying the degree by which the SOC value of the battery 100 deviates from the target value. The degree by which the SOC value of the battery 100 deviates from the target value may vary depending on the degree of deterioration of the fuel cell 200.

The degree of deterioration of the fuel cell 200 is a factor directly related to the performance of the fuel cell 200. As the degree of deterioration of the fuel cell 200 is lower, the performance of the fuel cell 200 may be determined to be higher. When the fuel cell 200 has high performance, the fuel cell 200 may generate an excessive amount of electrical energy to meet the required output of the vehicle. As the battery 100 is charged with the excessive amount of electrical energy generated in the present manner, the SOC value of the battery 100 may be increased.

In contrast, when the fuel cell 200 has low performance due to high degree of deterioration of the fuel cell 200, the fuel cell 200 may fail to generate a sufficient amount of electrical energy to meet the required output of the vehicle. In the instant case, the battery 100 may be discharged to supplement the insufficient portion of the electrical energy, reducing the SOC value of the battery 100.

That is, the SOC value of the battery 100 may be increased or reduced due to the degree of deterioration of the fuel cell 200, increasing the change rate in the SOC value of the battery 100.

Thus, the battery control system of a fuel cell vehicle according to an exemplary embodiment of the present disclosure is directed to derive the change rate in the SOC value of the battery 100 based on the degree of deterioration of the fuel cell 200 and change the charge control factor or the discharge control factor of the battery 100 according to the derived change rate in the SOC value of the battery 100 to prevent the battery 100 from being overcharged or overdischarged, prevent the problem of the reduced fuel efficiency or the reduced acceleration performance of the vehicle caused by the stopped regenerative braking.

Hereinafter, specific operating principles of estimating the degree of deterioration of the fuel cell 200 will be described.

FIG. 3 is a graph illustrating I-V characteristics curves of the fuel cell 200, and FIG. 4 is a graph illustrating the degree of deterioration of the fuel cell 200 estimated based on the I-V characteristics curves of the fuel cell 200.

Referring to FIG. 3 and FIG. 4, the controller 300 of the battery control system of a fuel cell vehicle according to an exemplary embodiment of the present disclosure may estimate the degree of deterioration of the fuel cell 200 based on the operating time of the fuel cell 200 or the I-V characteristics curves of the fuel cell 200.

When the fuel cell 200 is used for an extended time, internal components of the fuel cell 200 deteriorate due to a variety of reasons, such as pollutants in the air, insufficient supply of a reaction gas while driving, periodic repetition of operation and stopping, the degeneration of electrolyte films, and imperfect driving conditions.

That is, the degree of deterioration of the fuel cell 200 may generally be proportional to the operating time of the fuel cell 200. Thus, the battery control system of a fuel cell vehicle according to an exemplary embodiment of the present disclosure estimates the degree of deterioration of the fuel cell 200 based on the operating time of the fuel cell 200.

For example, when the operating time of the fuel cell 200 is relatively short, the degree of deterioration of the fuel cell 200 may be estimated to be low. When the operating time of the fuel cell 200 is relatively long, the deterioration of the fuel cell 200 may be estimated to be high. In this regard, in FIG. 6, the degrees of deterioration of the fuel cell 200 estimated based on the operating time of the fuel cell 200 are expressed as being divided into a plurality of deterioration sections of the fuel cell 200. Here, the degrees of deterioration of the fuel cell 200 divided into a plurality of deterioration sections will be described later.

Furthermore, the degree of deterioration of the fuel cell 200 may be determined based on the I-V characteristics curves of the fuel cell 200. The "I-V characteristics curves of the fuel cell 200" indicate the performance curves of the fuel cell 200, and will be described with reference to FIG. 3.

FIG. 3 illustrates a current-voltage tendency curve A of a fuel cell that has not deteriorated and a current-voltage tendency curve B of a fuel cell that has deteriorated. That is, in the "I-V characteristics curves of the fuel cell 200," I indicates the current of the fuel cell 200, and V indicates the voltage of the fuel cell 200.

Furthermore, the fuel cell that has not deteriorated indicates an initial fuel cell having a fresh state or a beginning of lift (BOL) state. The deteriorated fuel cell may be interpreted as a fuel cell that needs to be replaced due to the end portion of life (EOL) thereof resulting from deterioration or a fuel cell in a middle of life (MOL) state gradually converting from the BOL state to the EOL state.

Referring to FIG. 3, when currents are the same, it may be understood that the current-voltage tendency curve A of the fuel cell that has not deteriorated is positioned above the current-voltage tendency curve B of the fuel cell that has deteriorated.

That is, a voltage drop occurs in which the output voltage of the deteriorated fuel cell is lowered compared to the same current. Thus, the degree of deterioration of the fuel cell 200 may be estimated according to the degree by which the output voltage of the fuel cell 200 is lowered when the output voltage is measured by setting a specific current value as a reference current.

The controller 300 of the battery control system of a fuel cell vehicle according to an exemplary embodiment of the present disclosure estimates the degree of deterioration of the fuel cell 200 based on the I-V characteristics curves of the fuel cell 200. Here, the degree of deterioration of the fuel cell 200 may be estimated based on the voltage of the fuel cell 200 measured at a predetermined reference current. At the instant time, the predetermined reference current may be characterized by being a current measured at the upper limit voltage of the fuel cell 200 having a fresh state.

Before a detailed description of the present feature, the upper limit voltage of the fuel cell 200 will be described for a better understanding of the present disclosure.

The fuel cell vehicle may not only manage the SOC value of the battery 100 at a suitable level by setting the upper limit and the lower limit of the SOC value of the battery 100 but also limit the output voltage of the fuel cell 200 to obtain the durability of the fuel cell 200.

Setting the upper limit to the output voltage of the fuel cell 200 prevents the output voltage of the fuel cell 200 from being excessively high. When the output voltage of the fuel cell 200 is higher than the upper limit voltage, an excessive amount of power generated is used to charge the battery 100. Consequently, the output voltage of the fuel cell 200 may be maintained to not exceed the upper limit voltage.

However, in the overcharging of the battery 100, electrical energy generated by the fuel cell 200 may not be stored in the battery 100 any further. Thus, the output voltage of the fuel cell 200 may be excessively high, degrading the durability and the performance of the fuel cell 200. For example, the fuel cell 200 may deteriorate.

To prevent this, the upper limit voltage of the fuel cell 200 may be controlled differently according to the SOC value of the battery 100.

For example, when the SOC value of the battery 100 is near to the upper limit, the upper limit voltage of the fuel cell 200 may be increased to reduce the excessive amount of generated power used in the charging of the battery 100. In contrast, when the SOC value of the battery 100 is near to the lower limit, the upper limit voltage of the fuel cell 200 may be lowered, increasing the excessive amount of generated power used in the charging of the battery 100.

As the excessive amount of generated power used in the charging of the battery 100 is increased or reduced in the present manner, the SOC value of the battery 100 may be adjusted.

Meanwhile, the battery control system of a fuel cell vehicle according to an exemplary embodiment of the present disclosure estimates the degree of deterioration of the fuel cell 200 based on the output current of the fuel cell 200 measured at the above-described upper limit voltage. This feature will be described in detail with reference to FIG. 3 and FIG. 4.

In FIG. 3 and FIG. 4, C may indicate the upper limit voltage of the fuel cell 200. In FIG. 3, D may indicate the output current of the fuel cell 200 in the case of high-power driving. In FIG. 4, E may be understood as indicating the output current of the fuel cell 200 measured at the upper limit voltage of the fuel cell 200 having a fresh state. That is, according to an exemplary embodiment of the present disclosure, the predetermined reference current may be understood as corresponding to E in FIG. 4.

Meanwhile, describing an area (i.e., an area to the right of D in FIG. 3) corresponding to an output current higher than D in FIG. 3, it may be understood that the difference between the output voltage of the fuel cell 200 that has not deteriorated and the output voltage of the fuel cell 200 that has deteriorated decreases with increases in the output current of the fuel cell 200.

In other words, the difference between the current-voltage tendency curve A of the fuel cell that has not deteriorated and the current-voltage tendency curve B of the fuel cell that has deteriorated decreases with increases in output power with which the fuel cell vehicle is propelled. Thus, the degree of deterioration of the fuel cell 200 may not be easily distinguished based on the I-V characteristics curves of the fuel cell 200. Accordingly, it is difficult to estimate the degree of deterioration of the fuel cell 200.

In contrast, when E in FIG. 4 is set as a reference current, it may be understood that not only the difference between the current-voltage tendency curve A of the fuel cell that has not deteriorated and the current-voltage tendency curve B of the fuel cell that has deteriorated is relatively large, but also the difference between the current-voltage tendency curve A of the fuel cell that has not deteriorated and the current-voltage tendency curve B of the fuel cell that has deteriorated increases more or less even in the case that the output current of the fuel cell 200 is greater than E.

Thus, when E in FIG. 4 is set as the reference current, the degree of deterioration of the fuel cell 200 may be distinguished based on the I-V characteristics curves of the fuel cell 200 more easily than in the foregoing case (i.e., a case in which the determination is conducted based on the area to the right of D in FIG. 3).

Furthermore, the output current of the fuel cell 200 measured at the upper limit voltage of the fuel cell 200 having a fresh state is a value which may be previously derived through a plurality of experiments. The output current of the fuel cell 200 may be processed into data to be stored in an internal memory of the controller 300, and as an advantage, may be easily used as a reference current.

Next, operating principles of deriving the change rate in the SOC value of the battery 100 based on the degree of deterioration of the fuel cell 200 estimated by the controller 300 will be described in detail.

FIG. 5 is a table illustrating the degrees of deterioration of the fuel cell 200 estimated based on the I-V characteristics curves of the fuel cell 200 and divided into a plurality of deterioration sections, FIG. 6 is a table illustrating the degrees of deterioration of the fuel cell 200 estimated based on the operating time of the fuel cell 200 and divided into a plurality of deterioration sections, and FIG. 7 is a table illustrating the rates of change in the SOC value of a battery 100 individually derived in the respective deterioration sections divided in FIG. 5 and FIG. 6.

Referring to FIG. 5, FIG. 6 and FIG. 7, the controller 300 of the battery control system of a fuel cell vehicle according to an exemplary embodiment of the present disclosure may divide the degrees of deterioration of the fuel cell 200, estimated based on the operating time of the fuel cell 200 or the I-V characteristics curves of the fuel cell 200, into a plurality of deterioration sections, and derive each change rate in the SOC value of the battery 100 for a corresponding one of the plurality of deterioration sections.

In FIG. 5, the output voltages of the fuel cell 200 include four deterioration sections including "More than a," "a~b," "b~c," and "Less than c" based on the I-V characteristics curves of the fuel cell 200. The degrees of deterioration of the fuel cell 200 estimated in the respective deterioration sections are expressed as "F, G, H, and I."

Here, "a, b, and c" are the same as "a, b, and c" illustrated in FIG. 4. It may be understood that the output voltages measured from the output current of the fuel cell 200 measured at the upper limit voltage of the fuel cell 200 having a fresh state include four deterioration sections.

Furthermore, in FIG. 6, the operating times of the fuel cell 200 include four deterioration sections including "Less than 500 (h)," "500~1000 (h)," "1000~2000 (h)," and "More than 200 (h)", and the degrees of deterioration of the fuel cell 200 estimated the in respective deterioration sections are expressed as "F, G, H, and I."

Furthermore, in FIG. 7, the degrees of deterioration of the fuel cell 200 estimated in FIG. 5 are set as a vertical axis (Estimated by FC I-V Curve), and the degrees of deterioration of the fuel cell 200 estimated in FIG. 6 are set as a horizontal axis (Estimated by FC Operating Time). Furthermore, the change rate in the SOC value of the battery 100 (Change rate in Battery SOC) is expressed as a level.

Here, the change rate in the SOC value of the battery 100 is expressed as, for example, "level +1", "level +2," and "level +3," by applying a greater positive weight when the degree of deterioration of the fuel cell 200 is smaller. When the degree of deterioration of the fuel cell 200 is greater, the change rate in the SOC value of the battery 100 is expressed as, for example, "level −1," "level −2," and "level −3," by applying a greater negative weight. Furthermore, when all of the degrees of deterioration of the fuel cell 200 estimated in FIG. 5 and FIG. 6 are "H," the SOC value of the battery 100 is a same as a target value (Target SOC) which is a middle value of the upper limit and the lower limit. In the instant case, the change rate in the SOC value of the battery 100 is expressed as "level 0."

The change rate in the SOC value of the battery 100 may be derived by dividing the degrees of deterioration of the fuel cell 200 estimated based on the operating time of the fuel cell 200 in the present manner and the degrees of deterioration of the fuel cell 200 estimated based on the I-V curves of the fuel cell 200 in the present manner into a plurality of deterioration sections and applying weights according to the degree of deterioration of the fuel cell 200 estimated in the respective deterioration sections.

For reference, the respective deterioration sections divided into a plurality of deterioration sections in FIG. 5, FIG. 6 and FIG. 7 and a variety of numerical values are only illustrative for a better understanding of the present disclosure, and it may not be understood that the scope of the present disclosure is not limited thereby.

Meanwhile, FIG. 8 illustrates a second change rate in the SOC value of the battery 100 derived according to the current SOC value of the battery measured during the driving of the vehicle.

Referring to FIG. 8, the controller 300 of the battery control system of a fuel cell vehicle according to an exemplary embodiment of the present disclosure may derive a first change rate of the SOC value of the battery 100 based on the degree of deterioration of the fuel cell 200, measure the current SOC value of the battery 100 during the driving of the vehicle, and derive the second change rate of the SOC value of the battery 100 according to the difference between the current SOC value of the battery 100 measured during the driving of the vehicle and a predetermined reference value. Furthermore, the controller 300 of the battery control system of a fuel cell vehicle according to an exemplary embodiment of the present disclosure may derive a third change rate of the SOC value of the battery 100 based on the first rate and the second change rate of the SOC value of the battery 100 derived above.

Factors having effects on the change rate in the SOC value of the battery 100 include not only the degree of deterioration of the fuel cell 200 described above but also a "driving pattern of a vehicle."

Here, the driving pattern of a vehicle may be interpreted as a driving pattern in a variety of situations, for example, as in a case in which an air conditioning system (e.g., an air conditioner or a heater) of a vehicle is not used frequently, a case in which the vehicle frequently repeats driving and stopping, and a case in which regenerative braking is frequently performed, for example, when the vehicle travels on a downhill for an extended time.

In a situation like the driving pattern, the state of discharge of the battery 100 is relatively reduced or electrical energy with which the battery 100 is charged is relatively increased, increasing the SOC value of the battery 100. In contrast, in a situation opposite to the driving pattern, the state of discharge of the battery 100 is relatively increased or electrical energy with which the battery 100 is charged is relatively reduced, reducing the SOC value of the battery 100.

That is, when the vehicle is being driven for an extended time in a situation like the above-described driving pattern, the change rate in the SOC value of the battery 100 increases.

However, the driving pattern is necessarily different according to the vehicle driver, and thus, it is difficult to quantitatively measure an effect on the change rate in the SOC value of the battery 100.

Meanwhile, when the current SOC value of the battery 100 is measured during the driving of the vehicle, the change rate in the SOC value of the battery 100 may be derived in real time. Furthermore, the change rate in the SOC value of the battery 100 derived in real time during the driving of the vehicle includes both the degree of deterioration of the fuel cell 200 and an effect according to the driving pattern of the vehicle.

Thus, the change rate in the SOC value of the battery 100 according to the driving pattern of the vehicle may be derived by subtracting the change rate in the SOC value of the battery 100 derived based on the degree of deterioration of the fuel cell 200 from the change rate in the SOC value of the battery 100 derived in real time during the driving of the vehicle.

In this regard, the controller 300 of the battery control system of a fuel cell vehicle according to an exemplary embodiment of the present disclosure is configured to derive the first change rate of the SOC value of the battery 100 based on the degree of deterioration of the fuel cell 200, derive the second change rate of the SOC value of the battery 100 according to the current SOC value of the battery 100 measured during the driving of the vehicle, and derive the third change rate of the SOC value of the battery 100 by subtracting the first change rate of the SOC value of the battery 100 from the second change rate of the SOC value of the battery 100.

That is, according to an exemplary embodiment of the present disclosure, it may be understood that the "first change rate of the SOC value of the battery 100" means the change rate in the SOC value of the battery 100 derived based on the degree of deterioration of the fuel cell 200, the "second change rate of the SOC value of the battery 100" means the change rate in the SOC value of the battery 100 derived in real time during the driving of the vehicle, and the "third change rate of the SOC value of the battery 100" means the change rate in the SOC value of the battery 100 according to the driving pattern of the vehicle.

Here, the second change rate of the SOC value of the battery 100 may be derived by the controller 300 measuring the current SOC value of the battery 100 during the driving of the vehicle, and according to the difference between the current SOC value of the battery 100 measured during the driving of the vehicle and the predetermined reference value.

Furthermore, the "predetermined reference value" may be interpreted as being a target value (Target SOC), i.e., a middle value of the upper limit and the lower limit of the SOC value of the battery 100.

As a result, the change rate in the SOC value of the battery 100 according to the driving pattern of the vehicle (i.e., the third change rate of the SOC value of the battery 100) may be derived by subtracting the first change rate of the SOC value of the battery 100 from the second change rate of the SOC value of the battery 100 as described above.

Accordingly, it is possible to clearly distinguish factors having effects on the change rate in the SOC value of the battery 100 and thus differently control the effects according to the factors, more effectively preventing the overcharging or overdischarging of the battery 100.

FIG. 9 is a table illustrating changes in the charge control factor of the battery 100, and FIG. 10 is a table illustrating changes in the discharge control factor of the battery 100.

Referring to FIG. 9 and FIG. 10, the controller 300 of the battery control system of a fuel cell vehicle according to an exemplary embodiment of the present disclosure may change the charge control factor of the battery 100 according to the first change rate of the SOC value of the battery 100 and change the discharge control factor of the battery 100 according to the third change rate of the SOC value of the battery 100.

Here, the charge control factor of the battery 100 may be characterized by being the upper limit voltage of the fuel cell 200, and the discharge control factor of the battery 100 may be characterized by being the amount of output of the battery 100.

That is, the controller 300 of the battery control system of a fuel cell vehicle according to an exemplary embodiment of the present disclosure may change the upper limit voltage of the fuel cell 200 according to the first change rate of the SOC value of the battery 100, and change the amount of output of the battery 100 according to the third change rate of the SOC value of the battery 100.

Here, the amount of output of the battery 100 may be changed by adjusting the ratio of the output of the fuel cell 200 and the output of the fuel cell 200 or adjusting the upper limit voltage of the battery 100.

As described above, the "first change rate of the SOC value of the battery 100" means the change rate in the SOC value of the battery 100 derived based on the degree of deterioration of the fuel cell 200, and the "third change rate of the SOC value of the battery 100" means the change rate in the SOC value of the battery 100 according to the driving pattern of the vehicle.

That is, according to an exemplary embodiment of the present disclosure, when the change rate in the SOC value of the battery 100 is derived based on the degree of deterioration of the fuel cell 200, the controller 300 may change the amount of output of the battery 100 by changing the upper limit voltage of the fuel cell 200. When the change rate in the SOC value of the battery 100 is based on the driving pattern of the vehicle, the controller 300 may change the amount of output of the battery 100 by adjusting the ratio of the output of the battery 100 and the output of the fuel cell 200 or adjusting the upper limit voltage of the battery 100.

Hereinafter, these features will be described in more detail with reference to FIG. 9 and FIG. 10.

When the control is performed in J direction in FIG. 9, the degree of deterioration of the fuel cell 200 is relatively low, and the SOC value of the battery 100 is relatively high. Thus, it may be understood that the control is performed to reduce electrical energy with which the battery 100 is charged by increasing the upper limit voltage of the fuel cell 200.

In contrast, when the control is performed in K direction in FIG. 9, the degree of deterioration of the fuel cell 200 is relatively high, and the SOC value of the battery 100 is relatively low. Thus, it may be understood that the control is performed to increase electrical energy with which the battery 100 is charged by reducing the upper limit voltage of the fuel cell 200.

When the control is performed in L direction in FIG. 10, the driving pattern of the vehicle corresponds to a driving situation of increasing the SOC value of the battery 100, and the state of discharge of the battery 100 is relatively small. Thus, it may be understood that the control is performed to increase electrical energy discharged from the battery 100 by increasing the amount of output of the battery 100.

In contrast, when the control is performed in M direction in FIG. 10, the driving pattern of the vehicle corresponds to a driving situation of reducing the SOC value of the battery 100, and the state of discharge from the battery 100 is relatively large. Thus, it may be understood that the control is performed to reduce electrical energy discharged from the battery 100 by reducing the amount of output of the battery 100.

Meanwhile, the battery 100 disposed in the fuel cell vehicle is used as an auxiliary power source. In FIG. 10, it is illustrated that the amount of output of the battery 100 is changed by adjusting the ratio of the output of the battery 100 and the output of the fuel cell 200.

However, this is only illustrative for a better understanding of the present disclosure, and it may not be understood that the scope of the present disclosure is limited thereby. That is, alternatively, the amount of output of the battery 100 may be changed by adjusting the upper limit voltage of the battery 100.

As a result, it is possible to prevent the battery 100 from being overcharged or overdischarged by changing the charge control factor or the discharge control factor of the battery 100 in the present manner.

FIG. 2 is a flowchart illustrating a battery control method of a fuel cell vehicle according to an exemplary embodiment of the present disclosure.

Referring to FIG. 2, the battery control method of a fuel cell vehicle according to an exemplary embodiment of the present disclosure includes: step S100 of estimating, by a controller, the degree of deterioration of a fuel cell; steps S210, S220, and S230 of deriving, by the controller, the change rate in the SOC value of a battery based on the degree of deterioration of the fuel cell; and steps S310 and S320 of changing, by the controller, a charge control factor or a discharge control factor of the battery according to the derived change rate in the SOC value of the battery.

In the battery control method of a fuel cell vehicle according to an exemplary embodiment of the present disclosure, the S100 of estimating the degree of deterioration of the fuel cell may determine, by the controller, the degree of deterioration of the fuel cell based on the operating time of the fuel cell and the I-V characteristics curves of the fuel cell.

Furthermore, in the battery control method of a fuel cell vehicle according to an exemplary embodiment of the present disclosure, the steps S210, S220, and S230 of deriving the change rate in the SOC value of the battery may include: step S210 of deriving, by the controller, the first change rate of the SOC value of the battery based on the degree of deterioration of the fuel cell; step S220 of measuring, by the controller, the current SOC value of the battery while driving of a vehicle and deriving, by the controller, the second change rate of the SOC value of the battery according to the difference between the current SOC value of the battery measured during the driving of the vehicle and a predetermined reference value; and step S230 of deriving, by the controller, the third change rate of the SOC value of the battery based on a first change rate of the SOC value of the battery and a second change rate of the SOC value of the battery.

Meanwhile, in the battery control method of a fuel cell vehicle according to an exemplary embodiment of the present disclosure, the steps S310 and S320 of changing the charge control factor or the discharge control factor of the battery may change, by the controller, the charge control factor of the battery according to the first change rate of the SOC value of the battery in S310 and change, by the controller, the discharge control factor of the battery according to the third change rate of the SOC value of the battery in S320.

Furthermore, in the battery control method of a fuel cell vehicle according to an exemplary embodiment of the present disclosure, the steps S310 and S320 of changing the charge control factor or the discharge control factor of the battery may change, by the controller, the upper limit voltage of the fuel cell in S310 or change the amount of output of the battery in S320.

In each of the steps of the above-described battery control method of a fuel cell vehicle according to an exemplary embodiment of the present disclosure, a specific control method performed by the controller 300 and a specific operating principle are the same as those described above in the battery control system of a fuel cell vehicle according to an exemplary embodiment of the present disclosure, and repeated descriptions thereof will be omitted.

As set forth above, the battery control system and method of a fuel cell vehicle according to an exemplary embodiment of the present disclosure can derive the change rate in the SOC value of the battery 100 based on the degree of deterioration of the fuel cell 200, change the charge control factor or the discharge control factor of the battery 100 according to the derived change rate in the SOC value of the battery 100, divide reasons for the change rate of the SOC value of the battery 100 into the degree of deterioration of the fuel cell 200 or the driving pattern of the vehicle, and change the charge control factor or the discharge control factor of the battery 100 in response to respective situation. Thus, as an effect, the SOC value of the battery 100 may be stably adjusted.

Accordingly, it is possible to prevent the battery 100 from being overcharged or overdischarged, preventing the problems of reduced fuel efficiency and reduced accelerating performance of the vehicle caused by stopped regenerative braking.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by multiple control devices, or an integrated single control device.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A battery control system of a fuel cell vehicle, the battery control system comprising:
    a battery providing driving energy of the vehicle;
    a fuel cell providing the driving energy of the vehicle or charging the battery; and
    a controller configured to estimate a degree of deterioration of the fuel cell, derive a change rate in a state of charge (SOC) value of the battery based on the degree of deterioration of the fuel cell, and change a charge control factor or a discharge control factor of the battery according to the derived change rate in the SOC value of the battery.

2. The battery control system of claim 1, wherein the controller is configured to estimate the degree of deterioration of the fuel cell based on an operating time of the fuel cell or I-V characteristics curves of the fuel cell.

3. The battery control system of claim 2, wherein the controller is configured to determine the degree of deterioration of the fuel cell based on the I-V characteristics curves of the fuel cell, wherein the degree of deterioration of the fuel cell is estimated based on a voltage of the fuel cell measured at a predetermined reference current.

4. The battery control system of claim 3, wherein the predetermined reference current is a current measured at an upper limit voltage of the fuel cell including a fresh state.

5. The battery control system of claim 2, wherein the controller is configured to divide the degree of deterioration of the fuel cell, estimated based on the operating time of the fuel cell or the I-V characteristics curves of the fuel cell, into a plurality of deterioration sections and to derive the change rate in the SOC value of the battery from each of the deterioration sections.

6. The battery control system of claim 1, wherein the controller is configured to derive a first change rate of the SOC value of the battery based on the degree of deterioration of the fuel cell, to measure a current SOC value of the battery while driving of the vehicle, and to derive a second change rate of the SOC value of the battery according to a difference between the current SOC value of the battery measured during the driving of the vehicle and a predetermined reference value.

7. The battery control system of claim 6, wherein the controller is configured to derive a third change rate of the SOC value of the battery based on the derived first change rate of the SOC value of the battery and the derived second change rate of the SOC value of the battery.

8. The battery control system of claim 7, wherein the controller is configured to change the charge control factor of the battery according to the first change rate of the SOC value of the battery and to change the discharge control factor of the battery according to the third change rate of the SOC value of the battery.

9. The battery control system of claim 1, wherein the charge control factor of the battery is an upper limit voltage of the fuel cell, and the discharge control factor of the battery is an amount of output of the battery.

10. The battery control system of claim 9, wherein the controller is configured to change the amount of output of the battery by adjusting a ratio of an output of the battery and an output of the fuel cell or adjusting the upper limit voltage of the battery.

11. A battery control method of a fuel cell vehicle, the battery control method configured to control the battery control system in claim 1 and including:
   estimating, by the controller, the degree of deterioration of the fuel cell;
   deriving, by the controller, the change rate in the SOC value of the battery based on the degree of deterioration of the fuel cell; and
   changing, by the controller, the charge control factor or the discharge control factor of the battery according to the derived change rate in the SOC value of the battery.

12. The battery control method of claim 11, wherein, in the estimating of the degree of deterioration of the fuel cell, the controller is configured to estimate the degree of deterioration of the fuel cell based on an operating time of the fuel cell and I-V characteristics curves of the fuel cell.

13. The battery control method of claim 11, wherein the deriving of the change rate in the SOC value of the battery includes:
   deriving, by the controller, a first change rate of the SOC value of the battery based on the degree of deterioration of the fuel cell;
   measuring, by the controller, a current SOC value of the battery while driving of the vehicle and deriving, by the controller, a second change rate of the SOC value of the battery according to a difference between a current SOC value of the battery measured while driving of the vehicle and a predetermined reference value; and
   deriving, by the controller, a third change rate of the SOC value of the battery based on the first change rate of the SOC value of the battery and the second change rate of the SOC value of the battery.

14. The battery control method of claim 13, wherein, in the changing of the charge control factor or the discharge control factor of the battery, the controller is configured to change the charge control factor of the battery according to the first change rate of the SOC value of the battery and changes the discharge control factor of the battery according to the third change rate of the SOC value of the battery.

15. The battery control method of claim 11, wherein, in the changing of the charge control factor or the discharge control factor of the battery, the controller is configured to change an upper limit voltage of the fuel cell or to change an amount of output of the battery.

16. The battery control method of claim 15, wherein the controller is configured to change the amount of the output of the battery by adjusting a ratio of the output of the battery and an output of the fuel cell or adjusting the upper limit voltage of the battery.

17. The battery control method of claim 12, wherein, in the estimating of the degree of deterioration of the fuel cell, the controller is configured to determine the degree of deterioration of the fuel cell based on the I-V characteristics curves of the fuel cell, wherein the degree of deterioration of the fuel cell is estimated based on a voltage of the fuel cell measured at a predetermined reference current.

18. The battery control method of claim 17, wherein the predetermined reference current is a current measured at an upper limit voltage of the fuel cell including a fresh state.

* * * * *